G. S. NOBLE.
MIXER.
APPLICATION FILED AUG. 19, 1907.

1,018,629.

Patented Feb. 27, 1912.

Witnesses.
A. W. Fenstermaker
M. F. Stein

Inventor.
Glenn S. Noble

UNITED STATES PATENT OFFICE.

GLENN S. NOBLE, OF CHICAGO, ILLINOIS.

MIXER.

1,018,629.   Specification of Letters Patent.   Patented Feb. 27, 1912.

Application filed August 19, 1907. Serial No. 389,118.

*To all whom it may concern:*

Be it known that I, GLENN S. NOBLE, a citizen of the United States, residing at Chicago, in the county of Cook and State of Illinois, have invented certain new and useful Improvements in Mixers, of which the following is a specification.

This invention relates more particularly to mixers or mixing machines adapted to mix various materials, for instance, concrete, mortar or the like, and it consists in the novel features of construction and improved parts which will be hereinafter fully described and pointed out. Its objects are to improve the general construction and efficiency of such machines.

Figure 1:
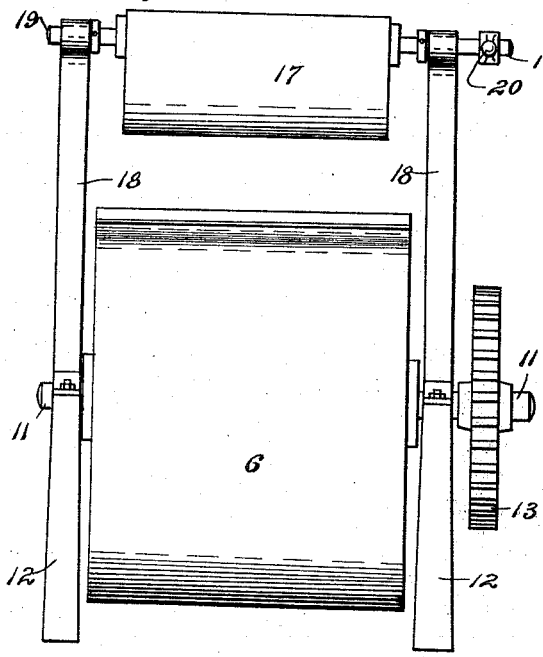
Figure 2:
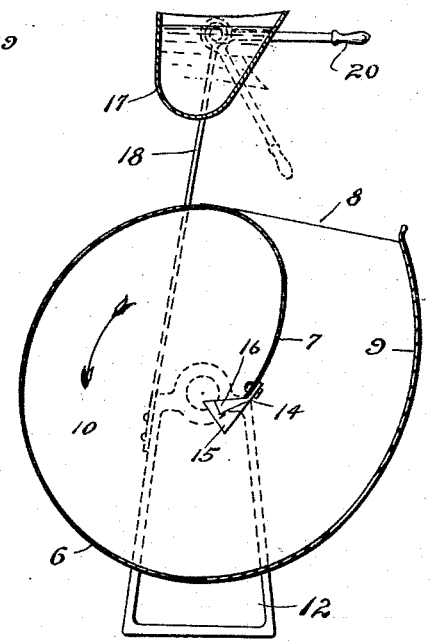
Figure 3:
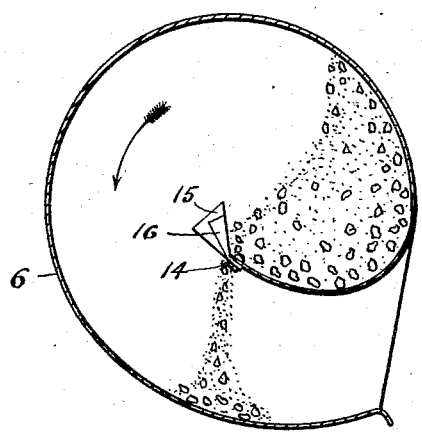
Figure 4:
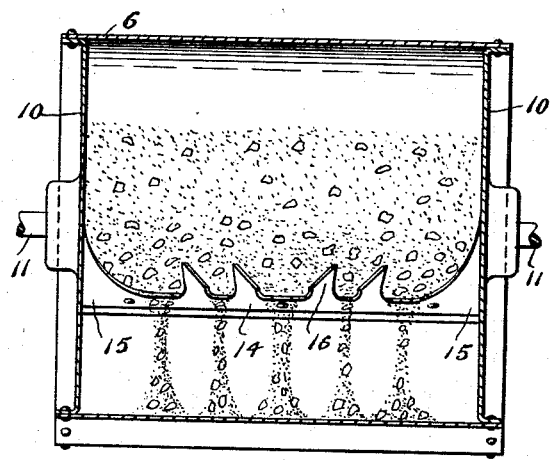

I have illustrated my invention in the accompanying drawings in which:

Figure 1 is a front elevation of the mixing machine embodying this invention. Fig. 2 is a transverse sectional view of the same. Fig. 3 is another sectional view showing the method of operation. Fig. 4 is a longitudinal sectional view, and, Fig. 5 is a detail showing a toothed deflector plate.

As shown in the drawings, 6 represents a mixer drum having a substantially spiral shape in cross section; that is with an inturned portion 7 adjacent to the feed and discharge opening 8 and opposed to the outer lip or surface 9 which forms the other side of the discharge opening. The drum is provided with heads 10, 10, having trunnions 11 mounted in suitable bearings on stands or frame 12. The drum may be driven in any desired manner as for instance, by gear wheel 13 mounted on one of the trunnions 11 and adapted to be driven from any suitable source of power, not shown.

Figure 5:
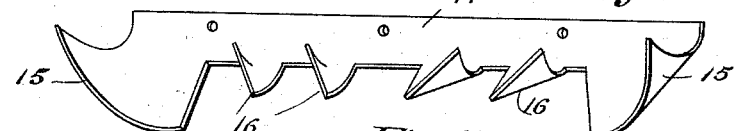

The inturned portion of plate 7 is provided on its inner edge with a toothed plate 14 as shown in particular in Fig. 5. This plate is preferably made with the ends 15, 15 curved upward to engage with the heads of the drum, or substantially as shown in the drawings; and is also provided with a number of teeth or blades 16, 16, these blades being spaced at equal distances at either side of the center and curved or twisted in opposite directions so that material falling over the same will be deflected from the ends toward the center of the drum. This plate is preferably made separate from the plate forming the drum, but it is obvious that the same might, in some instances, be made integral therewith, and it is also obvious that the plate 14 might be made for instance of two separate pieces, or the curved ends and teeth or deflectors may all be made of separate pieces.

Another feature of this invention consists in the water tank 17 which is suitably mounted on supports 18 attached to the stands 12. This water tank is also supported on a shaft or trunnions 19 in such a manner that it will normally stand in upright position as shown in Fig. 2. The tank may be tipped in any desired manner as for instance, by means of a handle 20 attached to one of the trunnions 19.

The mixing drum is filled with the material to be mixed, when it is in about the position shown in Fig. 2. If concrete is to be made, the various ingredients may be dumped in in any desired order. The tank 17 is filled in any desired manner as by means of a hose from a source of water supply, and the water may be accurately measured in said tank. When the water is to be discharged into the drum, all that is necessary is for the operator to move the handle 20 as indicated in dotted lines in Fig. 2, which will cause the water to be discharged into the opening 8 in the drum. The handle is then released and the tank again resumes its upright position for filling. Then, all of the material being in the drum, it is turned in the direction indicated by the arrows which will cause the material to be raised and gathered into the pocket or recess formed by the inturned edge 7. The material then falls from this pocket or recess over the toothed plate 14 as indicated in Figs. 3 and 4. The curved ends 15 will gather the material from the heads of the drum and discharge it for a considerable distance toward the center, and at the same time the teeth 16, raking through the material, will assist in mixing the same, and will also deflect it toward the center, whereby the material is given a longitudinal mixing as well as being mixed circumferentially by rolling around in the drum and falling over the inturned edge. As the material falls through the toothed plate and strikes against the outer portion of the drum, it will tend to again spread, and will in fact be spread evenly by the continued rotation of the drum.

On account of keeping the entire mass in the mixer substantially in continuous movement and then changing the direction of the movement by means of the teeth or deflectors and curved end portions as the mass passes over the inturned edge 7, there is comparatively slight tendency for the material to stick or clog in the drum. Furthermore, the weight of the mass of the material pressing against the curved ends and teeth as it passes over the inturned edge tends to keep them clean and free from clogging. This constant concentrating and massing of the material and giving it a longitudinal movement in the drum causes a thorough and efficient mixing in a comparatively short time. On account of the novel form of the drum and the arrangement of the deflectors, it is also easily cleaned when the mixing operation is over.

Having thus described my invention, which I do not wish to limit to the exact details of construction, what I claim and desire to secure by Letters Patent is:

1. A mixing drum having an inturned portion of the side provided at the inner edge with teeth, said drum being adapted to be rotated to mix material placed therein.

2. The combination with a mixing drum, of a toothed plate mounted in said drum, the teeth of said plate being bent to deflect the material longitudinally of said drum as it passes over said plate.

3. A mixing drum having heads and overlapping side portions forming a longitudinal opening, the inturned portion of said drum being provided with means for mixing material passing over said portion and for deflecting the material longitudinally of the drum.

4. The combination with a mixing drum, of a plate having oppositely bent teeth, and curved ends, said drum being adapted to be rotated to mix material placed therein, for the purpose herein set forth.

5. The combination with a mixing drum having overlapping side portions forming a longitudinal opening, of curved deflectors at the ends of the inturned portion for deflecting the material toward the center of the drum as it passes over said inturned portion, and teeth between said curved deflectors, serving to intermingle the material passing over said inturned portion.

GLENN S. NOBLE.

Witnesses:
CARL H. CRAWFORD,
A. D. FANSTEMAKER.

---

Copies of this patent may be obtained for five cents each, by addressing the "Commissioner of Patents, Washington, D. C."